United States Patent [19]

Eakman et al.

[11] 4,284,423
[45] Aug. 18, 1981

[54] SEPARATION OF CARBON DIOXIDE AND OTHER ACID GAS COMPONENTS FROM HYDROCARBON FEEDS CONTAINING ADMIXTURES OF METHANE AND HYDROGEN

[75] Inventors: James M. Eakman, Houston, Tex.; Harry A. Marshall, Madison, N.J.

[73] Assignee: Exxon Research & Engineering Co., Florham Park, N.J.

[21] Appl. No.: 967,648

[22] Filed: Dec. 8, 1978

Related U.S. Application Data

[63] Continuation-in-part of Ser. No. 878,044, Feb. 15, 1978, abandoned, which is a continuation of Ser. No. 692,986, Jun. 4, 1976, abandoned.

[51] Int. Cl.³ .............................................. F25J 3/02
[52] U.S. Cl. ........................................ 62/28; 62/26
[58] Field of Search ................................ 62/24–28

[56] References Cited

U.S. PATENT DOCUMENTS

| | | | |
|---|---|---|---|
| 2,274,094 | 2/1942 | Rupp | 62/27 |
| 3,001,373 | 9/1961 | Eastman et al. | 62/27 |
| 3,319,428 | 5/1967 | Isaacson | 62/26 |
| 4,115,086 | 9/1978 | Jordan et al. | 62/28 |

*Primary Examiner*—Norman Yudkoff
*Attorney, Agent, or Firm*—L. A. Proctor; Wayne Hoover

[57] ABSTRACT

A process for the separation of carbon dioxide and other acid gas components, in a compound distillation column, from a gaseous mixture comprised of one or more hydrocarbons, inclusive of methane, and hydrogen. The compound distillation column is sectioned (or zoned), one section of which is operated at higher pressure than another, and hence in a relative sense is referred to as a high pressure section while the other is referred to as a low pressure section. A product, principally methane, is removed from the high pressure section while a product of principally acid gases is removed from the low pressure section. By maintaining the sections at different pressure, the separations are more efficiently made and phase separation of products in the low pressure section is easily maintained.

13 Claims, 2 Drawing Figures

SEPARATION OF CARBON DIOXIDE AND OTHER ACID GAS COMPONENTS FROM HYDROCARBON FEEDS CONTAINING ADMIXTURES OF METHANE AND HYDROGEN

CROSS-REFERENCE TO RELATED APPLICATIONS

This application is a continuation-in-part of copending U.S. application Ser. No. 878,044, filed Feb. 15, 1978 now abandoned, which is a continuation of U.S. application Ser. No. 692,986, filed June 4, 1976 now abandoned.

BACKGROUND OF THE INVENTION

This invention relates to a method for separating an acid gas from gaseous mixtures comprising a hydrocarbon and an acid gas. More particularly, this invention relates to a distillation process for separating an acid gas from a gaseous mixture comprising a hydrocarbon and an acid gas.

Gaseous hydrocarbons, particularly those produced in industrial operations, are characterized generally as admixtures of hydrocarbons in varying concentration, inclusive of nonhydrocarbon components. Many include acid gas components which must be removed. Carbon dioxide and other acid gas components such as $H_2S$, COS and $SO_2$ often occur in admixture with hydrocarbons, notably methane, as in natural gas or synthetic natural gas, and must be separated from the hydrocarbon gas prior to its commercial use, e.g., as a fuel. A process of outstanding importance, in this regard, requires the separation of carbon dioxide and other acid gas components from a mixture of methane and synthesis gas (an admixture of carbon monoxide and hydrogen). The separation of carbon dioxide from such mixtures is quite burdensome, particularly since it is often contained within a gaseous mixture in concentrations ranging as high as thirty mol percent and greater. Removal of the carbon dioxide by scrubbing with alkaline solutions, e.g., aqueous amine solutions, is usually prohibitive when the concentration of the carbon dioxide exceeds about two or three mol percent.

The separation of components of different boiling points by distillation usually provides advantages but the separation of carbon dioxide from liquefied hydrocarbon streams is quite burdensome because carbon dioxide crystalizes, solidifies or "ices-up" over a wide range of temperature and pressure conditions, which ranges often overlap or correspond to those required for most effective separation. The formation of a solid phase in a distillation column for obvious reasons is generally viewed as intolerable.

Despite various difficulties associated with the separation of carbon dioxide from gaseous hydrocarbon streams, a process for effecting the separation of carbon dioxide from a predominantly methane stream is described in U.S. Pat. No. 2,888,807 to Phillip E. Bocquet. The separation rerequires the use of two distillation columns, each operated under different sets of conditions dependent upon the concentration of carbon dioxide, (a) as ranging below 8 mol percent or (b) as ranging above 8 mol percent. In each instance the first and second distillation columns, respectively, of the two different types of operation are maintained under the same operating conditions, the respective operations differing only in that the feed is introduced at different locations. Where the carbon dioxide is present in the lower concentrations the feed is directly introduced into the first column of the series and where the carbon dioxide is present in the higher concentrations the feed is directly introduced into the second column of the series.

In each type of operation characterizing the Bocquet process the first columns are operated at or below the critical temperature of methane such that feeds to a respective column provide a carbon dioxide concentration below that which, on cooling at the operating pressure of the column, would produce a solid carbon dioxide phase. Effluents from the top of the second columns contain substantially the same concentration of carbon dioxide as the feeds to said first columns. The operating pressure applied to said second columns is maintained above a pressure defined as that at which the carbon dioxide phase will exist, and above which pressure a solid carbon dioxide phase will not coexist with a vapor. Whereas this process has provided certain advantages over previous processes it nonetheless possesses acute disadvantages. A notable disadvantage is that the operation becomes particularly complex when it it is required to treat methane streams of varying carbon dioxide concentration ranging about and below 8 mol percent carbon dioxide. A further acute disadvantage is that this process, like prior art distillation processes, generally does not remove significant amounts of the carbon dioxide present and consequently cannot be used when it becomes necessary to remove greater amounts of the carbon dioxide.

SUMMARY OF THE INVENTION

It is, accordingly, the primary objective of this invention to obviate these and other prior art deficiencies, particularly by providing a new and improved distillation process for the separation in a compound column of acid gas components from hydrocarbon streams.

A particular object of this invention is to provide a process wherein carbon dioxide can be separated from methane gas streams by distillation in a compound column, or column wherein the distillation is carried out in two or more sections (or zones) operated at different pressures.

A more specific object of this invention is to provide a process of such character for the more effective separation of carbon dioxide from gaseous methane streams, notably gaseous streams wherein methane is contained or provided in admixture with carbon monoxide and hydrogen.

These objects and others are achieved in accordance with the present invention characterized as a process for the separation in a compound distillation column of carbon dioxide and other acid gas components from a gaseous hydrocarbon feed, notably a feed stream consisting generally of a hydrocarbon or mixture of hydrocarbons inclusive of methane and hydrogen. The hydrogen is present in the feed stream, ab initio, or added to the distillation zones to provide a hydrogen concentration ranging from about 6 to about 35 mol percent, preferably from about 20 to about 35 mol percent, within the feed stream introduced into the distillation zones. Preferably, the predominant hydrocarbon within the gaseous feed stream is methane. More preferably, the feed streams contain from about 30 to about 85 mol percent and preferably from about 50 to about 80 mol percent methane. The compound distillation employed is one provided with two or more sections, or zones, operated at different elevated pressures, one relative to another. In its practical aspects, the fractionation can be carried out in two separate distillation columns, or in a compound distillation column, one section (or zone which is operated (in the relative sense) at a "high pressure" and the other of which is operated at a "low pressure." The high pressure section specifically is operated at a selected pressure ranging above 600 psia (pounds per square inch absolute), preferably from about 600 psia to about 2000 psia. The low pressure section (or zone) is generally operated at a pressure more than about 50 psia below that employed in the high pressure zone. In absolute terms, the pressure of the low pressure zone ranges below about 1073 psia, preferably from about 80 psia to about 1070 psia, and more preferably from about 200 psia to about 700 psia.

DETAILED DESCRIPTION OF THE INVENTION

Figure 1:
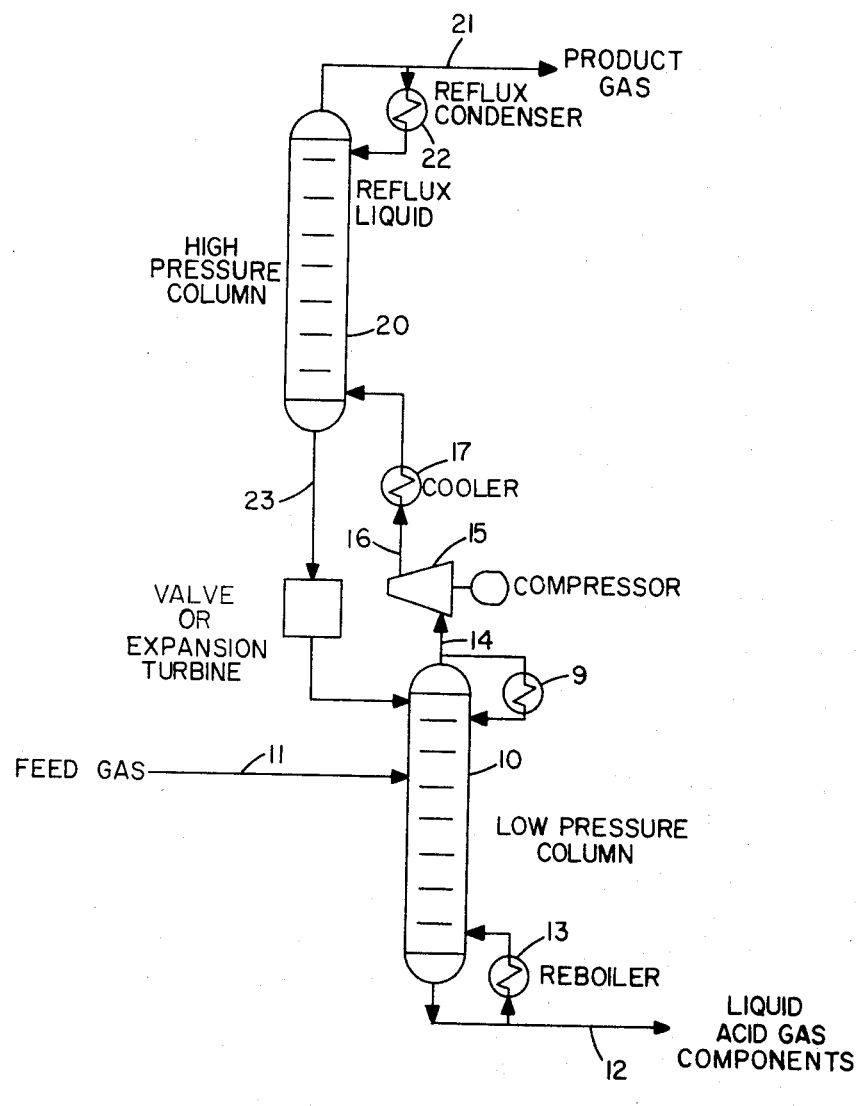
FIG. 1 depicts distillation apparatus in schematic form and an arrangement of the apparatus and associated apparatus components adapted to carry out the present process.

In the operation of the separation process of this invention, the carbon dioxide containing feed gas is preferably introduced into the low pressure section of the column and the total pressure in this section is maintained below the critical pressure of carbon dioxide, the primary component of the liquid bottoms. By maintaining a pressure well below the critical pressure of carbon dioxide phase separation of liquids readily occurs within this section of the column. Suitably, the temperature within the uppermost stage of the low pressure section of the column is maintained above about $-100°$ F., and the temperature at the uppermost stage and the lowermost stage of the column, respectively, ranges from above about $-100°$ F. to below about $+85°$ F., preferably from above about $-80°$ F. to below about $+45°$ F. The gas from the low pressure section, prior to or at the time of its introduction into the high pressure section of the distillation or fractionation column, is cooled. Suitably, the temperature within the uppermost stage of the high pressure section of the column is maintained above about $-170°$ F. and the temperature at the uppermost stage and the lowermost stage of the column, respectively, ranges above about $170°$ F. to less than about $-80°$ F., preferably from above about $-145°$ F. to below about $-85°$ F. In accordance with such process it becomes feasible to effect almost complete separation of carbon dioxide and other acid gas components from a methane-containing feed gas such as natural gas or synthesis gas.

In copending application Ser. No. 833,937, filed Sept. 16, 1977 by James M. Eakman and Harry A. Marshall, now U.S. Pat. No. 4,149,864, there is also described a process for the separation of carbon dioxide and other acid gas components from methane feeds by low temperature high pressure distillation. This process, which utilizes a simple distillation column to effect such separation, is an improvement over prior art processes used to effect acid gas separation from hydrocarbons. It is superior, inter alia, in that carbon dioxide separation above 90 mol percent and even on the order of about 95 to 99 mol percent and higher is achieved. It is entirely feasible, in fact, to provide products which contain carbon dioxide levels of only about 5 to about 1 mol percent and less. Whereas this process has proven admirably effective for carbon dioxide separation from methane, it is nonetheless necessary to maintain close control of the conditions of operation to assure adequate methane and carbon dioxide phase separation at the bottom of the column. Thus, at the high total pressure required to effect maximum removal of the carbon dioxide from the effluent taken from the upper stages of the column, the increased pressure at the bottom of the column approaches the critical pressure of carbon dioxide, the primary component leaving the bottom of the column, which makes it difficult to effect the phase separation required. This problem is avoided and all of the other advantages of the simple column approach are retained. Essentially complete removal of the carbon dioxide can be effected in accordance with the present process by use of a compound distillation column or column having a section which is operated at relatively low pressure at the location where a carbon dioxide-rich product is removed and a section which is operated at relatively high pressure at the location wherein a methane-rich product is removed.

The distillation is carried out in conventional vapor-liquid contacting apparatus comprising a single column with associated high pressure and low pressure sections or in separate associated columns, one of which is operated at high pressure and the other of which is operated at low pressure.

DESCRIPTION OF THE PREFERRED EMBODIMENT

Referring to FIG. 1, there is shown fractionating columns 10, 20, each of the vapor-liquid contact type constituted generally of an outer metal shell within which is provided a plurality of vertically separated bubble cap trays. Column 10 is a low pressure column, or column operated at lower pressure than column 20. Hence, column 10 is designated in the figure as the low pressure column and column 20 as the high pressure column. In an operation, a gaseous feed which contains carbon dioxide, methane and hydrogen and which may also contain nitrogen, carbon monoxide and other components, after passage through a heat exchanger (not shown), is introduced via line 11 into about the middle or upper portion of column 10.

In the lower column, in order to maintain two phases, the total pressure must be maintained below the critical pressure for $CO_2$ $$P_{tot,1} < 1073 \text{ psia}$$

This is because there is essentially pure $CO_2$ in the bottom part of the column. Also in the lower column, the sum of the partial pressures of $CO_2$ and $CH_4$ at all points must be greater than the pressure expressed by the following relationship to avoid $CO_2$ freeze-out:

$$P_{CO_2} + P_{CH_4} < -10238 - T(237.36 + 1.2850T)$$

where pressures are expressed in psia and temperatures in degrees Fahrenheit. This relationship applies over the temperature range from $-100°$ F. to the $CO_2$ triple point temperature or $-69.9°$ F. In practice this limitation would only effect the conditions in the top stage or partial condenser of the lower column. Alternatively, this may be expressed as:

$$P_{tot,1} > \frac{-10238. - T(237.36 + 1.2850T)}{Y_{CH_4,1} + Y_{CO_2,1}}$$

where $Y_{CH_4,1}$ and $Y_{CO_2,1}$ are the mol fractions of $CH_4$ and $CO_2$ in the vapor leaving the lower column 10. The specific values of these mol fractions will be affected by the temperature, flow rate and composition of the feed, and by the flow rate and composition of the bottoms stream 23 from the high pressure column. The specific values may be computed by the usual stage-to-stage computation procedures used for predicting the performance of a distillation column.

The primary function of the lower pressure column 10 is to reduce the quantity of methane and other more volatile constituents leaving the bottom of the column with the liquid acid gas components. As previously indicated, column 10 is necessarily maintained at a pressure less than about 1073 psia, the critical pressure of carbon dioxide, which is the primary component of the liquid leaving the column. Preferably, however, the total pressure is maintained from about 200 psia to about 700 psia. The upper stage of the low pressure column 10 is operated such that no solid carbon dioxide formation can occur. For best results this requires, in column 10, a top stage temperature above about $-100°$ F., preferably above about $-80°$ F., and a vapor composition of approximately 10 mol percent carbon dioxide or greater. Product of highly concentrated acid gas components is withdrawn as a liquid via line 12 after recirculation of a portion of the product through a reboiler-type heat exchanger 13.

A portion of the vapor from the top stage of the low pressure column 10 is recirculated through a condenser 9, which can be an external condenser (as shown) or an internal condenser and condensed for the return of liquid as reflux. Uncondensed vapor from the top stage of the low pressure column 10 is compressed and preferably cooled before feeding it to the high pressure fractionation column 20. Suitably, effluent vapors from column 10 are passed via line 14 to a compressor 15 and then passed via line 16 through a heat exchanger 17, cooled and then injected into the column at some suitable location, e.g., at the bottom of column 20. In order for $CO_2$ freeze-out to be prevented in the upper stages of the higher pressure upper column the total pressure in the upper stages at this column must be:

$$P_{tot,2} > \frac{705 \text{ psia}}{Y_{CH_4,2} + Y_{CO_2,2}}$$

where $Y_{CH_4,2}$ and $Y_{CO_2,2}$ are the local mol fractions in the vapor. In terms of the reflux ratio (L/D=mols liquid reflux/mols vapor distillate) and feed composition. This pressure may be expressed more generally as:

$$P_{tot,2} > \frac{705 \text{ psia}}{\left[\frac{Z_{CH_4} + \left(\frac{L}{D}\right)(Z_{CH_4} + Z_{H_2} + Z_{CO} + Z_{N_2})}{\left(1 + \frac{L}{D}\right)(Z_{CH_4} + Z_{H_2} + Z_{CO} + Z_{N_2})}\right]}$$

where:

$Z_{H_2}$=mol fraction $H_2$ in feed
$Z_{CO}$=mol fraction CO in feed (when present)
$Z_{N_2}$=mol fraction $N_2$ in feed (when present)
$Z_{CH_4}$=mol fraction $CH_4$ in feed
L/D=mol liquid reflux/mols vapor distillate The total mols of feed to the column are F mols/hour, hence the feed rate of an individual component, e.g., $CO_2$, is given by $$F \, Z_{CO_2}$$

Again, in order to maintain liquid and vapor phases in the upper stages of the column, it is necessary to keep the total column pressure below the mixture critical pressure. For the $CH_4$—$H_2$ binary this is defined by:

$$P_{tot,2} < (673 + 488Y_{H_2,2} + 11,280Y_{H_2,2})\text{psia}$$

where:

$$Y_{H_2,2} = \frac{Z_{H_2}}{\left(1 + \frac{L}{D}\right)(Z_{CH_4} + Z_{H_2} + Z_{CO} + Z_{N_2})}$$

and
$Z_{H_2}$=mol fraction $H_2$ in feed
$Z_{CO}$=mol fraction CO in feed (when present)
$Z_{N_2}$=mol fraction $N_2$ in feed (when present)
$Z_{CH_4}$=mol fraction $CH_4$ in feed
L/D=mol liquid reflux/mols vapor distillate However, there is no limitation on the total pressure in this column being maintained below 1073 psia as there is in the single column case. That is, use of the compound column has removed the restriction of staying below the $CO_2$ critical for the second column, since pure $CO_2$ does not exist at any point in the second column.

The primary function of the higher pressure column 20 is to reduce the quantity of acid gas components in the overhead gas. This column is maintained at a pressure greater than 600 psia and generally at least 50 psia above the pressure of low pressure column 10. Column 20 is designed and operated to reduce the carbon dioxide to a desired level by control of temperature and the rate of the reflux liquid, by virtue of which the carbon dioxide content can be reduced to a level below one mol percent. the formation of solid carbon dioxide is prevented, even at reflux temperatures well below $-80°$ F., by maintaining the column pressure at a suitable level above approximately 600 psia. In the presence of hydrogen, gas and liquid phases will be present in the fractionator at these higher pressures, which are above the critical pressure of methane (673 psia). The range of satisfactory operating conditions for this column will depend to some extent on the number of trays employed, on the composition of the particular feed gas that is processed and on the desired level of carbon dioxide desired in the product.

Overhead vapors consisting primarily of methane or methane and carbon monoxide and hydrogen are removed via line 21 since the primary function of the upper stages of column 20 is to reduce the quantity of carbon dioxide and other acid gas components leaving the top of the column. A portion of the vapors is recirculated through an external condenser 22. The condenser, however, can be internal or external but is illustrated for convenience as an external condenser. Uncondensed effluent is withdrawn via line 21 from column 20 and stored.

The level of carbon dioxide contained in the overhead product from column 20 is controlled by a combination of staging, temperature and rate of reflux liquid. The upper stage temperature is maintained above about −170° F. but for best results the temperature is maintained above about −145° F. Suitably, the molar ratio of liquid:distillate used as reflux ranges about 1.25:1, and higher and preferably about 1.3:1 and higher. The process is particularly suitable for the separation of carbon dioxide from admixtures of methane ($CH_4$) and synthesis gas ($H_2+CO$) at molar ratios of $CH_4$:($H_2+CO$) of about 1:1 to about 5:1, and gas feed not of this composition can be readily adjusted in situ or ex situ by the addition of components to provide such mixture. With some feed gases it may thus be desirable or preferred to add methane or hydrogen or carbon monoxide or both to either the feed gas or to the gas entering the higher pressure column in order to adjust the gas composition to the preferred range.

The liquid phase from the bottom of the high pressure column 20 can be returned to the low pressure column and introduced at some suitable location either by expansion, as through line 23 containing, e.g., a Joule-Thompson valve, or by heat exchange with the higher temperature compressed gas from the low pressure column followed by expansion through a turbine, or by some combination of the two techniques. In the latter instance the expansion turbine can be used to help drive the compressor thus reducing the total energy requirement of the system.

Figure 2:
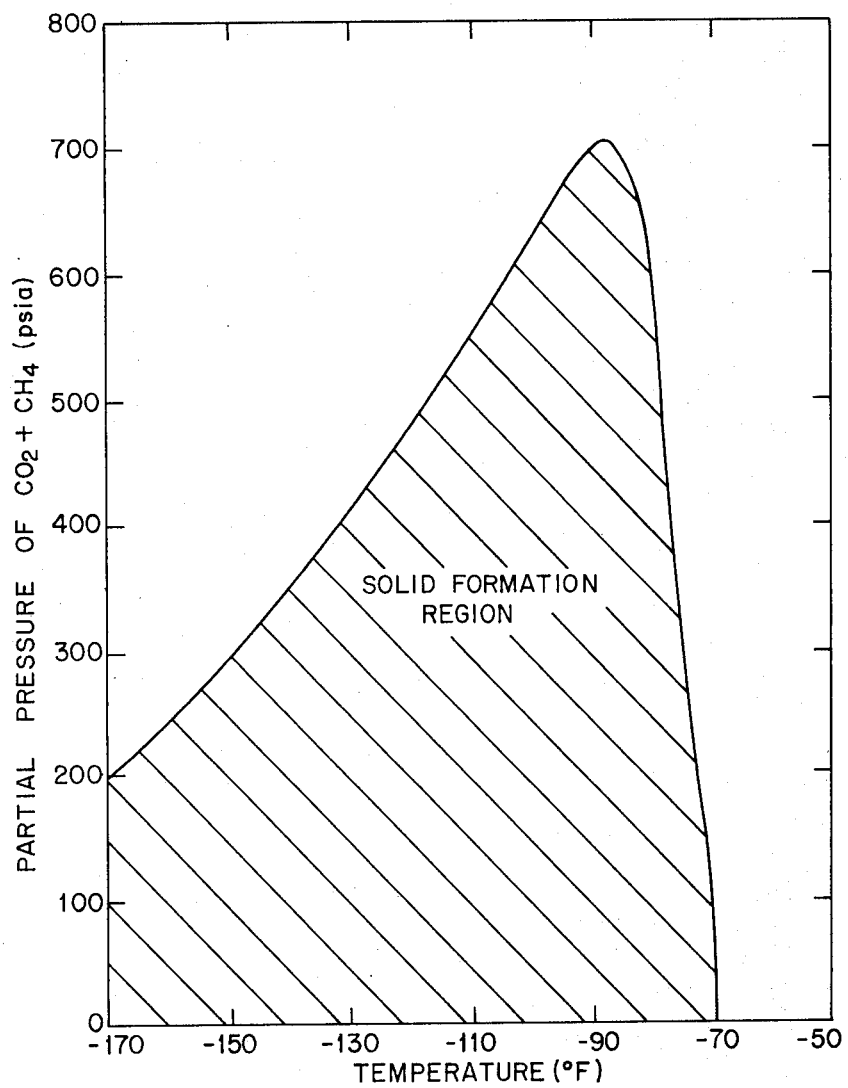
FIG. 2 depicts a diagram representative of the interrelationship between temperature and partial pressure of carbon dioxide and methane ($CO_2 + CH_4$) wherein solid phase formation can occur, which region is to be avoided in the operation.

Referring to FIG. 2, there is graphically described an essential relationship between temperature in °F. and the partial pressure of carbon dioxide and methane ($CO_2+CH_4$), expressed in pounds per square inch absolute, if solid formation is to be avoided in such systems. It will be observed that in order to avoid the formation of solids, operation of the column at temperatures ranging from about −170° F. to about −84° F. as shown on the x-axis requires higher and higher partial pressures of carbon dioxide and methane as shown on the y-axis ranging from about 200 psia to about 710 psia at the higher temperature. Thereafter, up to about −70° F., the partial pressure that is required declines. The relationship expressed in the graph which is required to avoid the solids formation region is tabulated for convenience as follows:

| Temperature, °F. | Partial Pressure of ($CO_2$ + $CH_4$), psia |
|---|---|
| −170 | >200 |
| −150 | >280 |
| −130 | >420 |
| −110 | >550 |
| −90 | >700 |
| −84 | >710 |
| −70 | >75 |

In sharp contrast to prior art distillation processes for effecting such separations which remove only about 90 mol percent of the carbon dioxide it has been found feasible to remove carbon dioxide to a level of 1 mol percent or less in the admixture of carbon dioxide and methane, or methane in admixture with other hydrocarbons and hydrogen, e.g., methane and synthesis gas, in a compound column utilizing generally 20 to 30 theoretical stages. This is conveniently illustrated by reference to the following example which presents data taken from a computer-simulated run conducted as described.

EXAMPLE

Two columns are employed; a high pressure column having two theoretical trays and a low pressure column having twenty theoretical trays interconnected and fitted generally as described by reference to FIG. 1, except that the heat exchanger 17 is not employed; and a valve is employed instead of an expansion turbine. The columns are operated at conditions well within the parameters represented in the foregoing discussion. The high pressure column is operated at a pressure of 1100 psia and the low pressure column is operated at a pressure of 465 psia. The uppermost stage of the high pressure column (stage 2) is operated at −113° F. and the lowermost stage (stage 1) at −87° F. The uppermost stage of the low pressure column (stage 20) is operated at −93° F., which represents the equilibrium temperature of the product stream from the top of the low pressure column after compression, the reflux of product from the bottom stage of the high pressure column after passage through the valve, and the influx of gases and vapors from the lower stages of the low pressure column. The lowermost stage of the low pressure column (stage 1) is operated at +25.4° F.

A feed in the amount of 84.53 mols of the mol composition given in column 1 of Table 1 at −55° F., is introduced into stage 12 of the low pressure column. The mol composition of the product taken from the top of the low pressure column and injected into stage 1 of the high pressure column is given in column 2 of Table 1 and the mole composition of the product taken from the bottom of the high pressure column and injected into stage 20 of the low pressure column is given in column 3 of Table 1.

TABLE 1

|  | Mols | | |
|---|---|---|---|
| Hydrogen | 20.09 | 20.59 | 0.52 |
| Carbon Monoxide | 5.72 | 6.32 | 0.60 |
| Methane | 36.93 | 48.00 | 11.09 |
| Carbon Dioxide | 21.38 | 8.36 | 7.79 |
| Hydrogen Sulfide | 0.41 | 0.00 | 0.00 |
|  | 84.53 | 83.27 | 20.00 |

The molar ratio of liquid:distillate in the reflux which is returned to stage 2 of the high pressure column is maintained at 1.47. The product streams from the high pressure and low pressure columns are 63.27 mols and 21.23 mols, respectively. The composition of the components in the two streams are:

|  | Mols | |
|---|---|---|
|  | Vapor Overhead | Liquid Bottoms |
| Hydrogen | 20.07 | 0.02 |
| Carbon Monoxide | 5.72 | 0.00 |
| Methane | 36.91 | 0.02 |
| Carbon Dioxide | 0.57 | 20.81 |
| Hydrogen Sulfide | 0.00 | 0.40 |
|  | 63.27 | 21.23 |

These data show that it is quite feasible to remove carbon dioxide to a very low level, considerably below about 1 mol percent carbon dioxide present in the vapor phase mixture.

It is apparent that various modifications can be made in the process without departing the spirit and scope of the present invention.

Having thus described and illustrated the invention, what is claimed is:

1. In a process for the separation of carbon dioxide from a gaseous mixture comprising carbon dioxide and methane, the improvement comprising:
   (a) forming a feed stream from said gaseous mixture containing from about 6 to about 35 mol percent hydrogen and from about 30 to about 85 mol percent methane;
   (b) distilling said feed in a low pressure zone while maintaining said zone at a total pressure below about 1073 psia with the upper stage of said zone at a temperature above about $-100°$ F., said low pressure zone being operated such that the sum of the carbon dioxide partial pressure and the methane partial pressure, in psia at all points in the low pressure zone is greater than $$-10238 - T(237.36 + 1.285T)$$

when T is the temperature in degrees Fahrenheit and when T is within the range from $-100°$ F. to $-69.9°$ F.;
   (c) separating carbon dioxide as a primary component of a liquid bottom product withdrawn therefrom, while withdrawing a vapor effluent from said low pressure zone; and
   (d) introducing said vapor effluent into a high pressure zone maintained at a pressure above about 600 psia and a temperature above about $-170°$ F., said high pressure zone being operated such that the total pressure in psia is less than $$673 + 488 Y_{H2,2} + 11{,}280 Y_{H2,2}^2$$

where:

$$Y_{H2,2} = \frac{Z_{H2}}{\left(1 + \frac{L}{D}\right)(Z_{CH4} + Z_{H2} + Z_{CO} + Z_{N2})}$$

and:
   $Z_{H2}$ = mol fraction H$_2$ in feed
   $Z_{CO}$ = mol fraction CO in feed (when present)
   $Z_{N2}$ = mol fraction N$_2$ in feed (when present)
   $Z_{CH4}$ = mol fraction CH$_4$ in feed
   L/D = mol liquid reflux/mols vapor distillate but greater than:

$$P_{tot,2} > \frac{705 \text{ psia}}{\left[\dfrac{Z_{CH4} + \left(\frac{L}{D}\right)(Z_{CH4} + Z_{H2} + Z_{CO} + Z_{N2})}{\left(1 + \frac{L}{D}\right)(Z_{CH4} + Z_{H2} + Z_{CO} + Z_{N2})}\right]}$$

where:
   $Z_{H2}$ = mol fraction H$_2$ in feed
   $Z_{CO}$ = mol fraction CO in feed (when present)
   $Z_{N2}$ = mol fraction N$_2$ in feed (when present)
   $Z_{CH4}$ = mol fraction CH$_4$ in feed
   L/D = mol liquid reflux/mols vapor distillate.
   (e) separating a liquid, a part of which is recycled to the low pressure zone, and recovering a hydrocarbon product from said high pressure distillation zone, said low pressure zone being operated at a pressure more than about 50 psia below the pressure in said high pressure zone.

2. The process of claim 1 wherein the feed stream contains from about 20 to about 35 mol percent hydrogen.

3. The process of claim 1 wherein the feed stream contains from about 20 to about 35 mol percent hydrogen and from about 50 to about 80 mol percent methane.

4. The process of claim 1 wherein the low pressure distillation zone is operated at pressures ranging from about 30 psia to 1070 psia, and the upper and lower stage temperatures range above about $-100°$ F. and below about $+85°$ F., respectively.

5. The process of claim 4 wherein the sum total number of theoretical stages of the high and low pressure distillation zones range from about 20 to about 30 and the level of the carbon dioxide contained in the product ranges below about 1 mol percent.

6. The process of claim 4 wherein the molar ratio of liquid:distillate used in the low pressure distillation zone as reflux ranges about 1.25:1 and greater.

7. The process of claim 4 wherein the temperature of the upper and lower stages of the low pressure distillation zone ranges above about $-80°$ F. and below about $+45°$ F., respectively.

8. The process of claim 1 wherein the high pressure distillation zone is operated at pressures ranging from about 600 psia to about 2000 psia and the upper and lower stage temperatures range above about $-170°$ F. and below about 85° F., respectively.

9. The process of claim 8 wherein the upper and lower stage temperatures of the high pressure distillation zone ranges above about $-145°$ F. and below about $-80°$ F. respectively.

10. The process of claim 1 wherein hydrogen is added to the hydrocarbon feed and the feed is introduced into the low pressure zone to provide a feed stream containing the required hydrogen.

11. The process of claim 1 wherein the feed stream comprises a synthesis gas which contains CH$_4$, H$_2$ and CO, the molar ratio of CH$_4$:(H$_2$+CO) ranging from about 1:1 to about 5:1.

12. The process of claim 1 wherein hydrogen is added to the hydrocarbon feed, and the feed is introduced into the low pressure zone to provide a feed stream containing the required hydrogen.

13. The process of claim 1 wherein the feed stream comprises a synthesis gas which contains CH$_4$, H$_2$ and CO, the molar ratio of CH$_4$:(H$_2$+CO) ranging from about 1:1 to about 5:1.

* * * * *